(12) United States Patent
Helgason et al.

(10) Patent No.: US 9,098,900 B2
(45) Date of Patent: Aug. 4, 2015

(54) MEDICATION IDENTIFICATION AND VERIFICATION

(75) Inventors: Ivar S. Helgason, Kopavogur (IS); Gauti Thor Reynisson, Goirle (NL); Maria Runarsdottir, Kopavogur (IS)

(73) Assignee: Mint Solutions Holding BV, Almere (NL)

( * ) Notice: Subject to any disclaimer, the term of this patent is extended or adjusted under 35 U.S.C. 154(b) by 180 days.

(21) Appl. No.: 13/882,094

(22) PCT Filed: Oct. 27, 2011

(86) PCT No.: PCT/IB2011/002813
§ 371 (c)(1),
(2), (4) Date: Jul. 8, 2013

(87) PCT Pub. No.: WO2012/056317
PCT Pub. Date: May 3, 2012

(65) Prior Publication Data
US 2013/0279774 A1    Oct. 24, 2013

Related U.S. Application Data

(60) Provisional application No. 61/408,289, filed on Oct. 29, 2010.

(51) Int. Cl.
| | | |
|---|---|---|
| G06K 9/00 | (2006.01) | |
| G06T 7/00 | (2006.01) | |
| A61J 7/00 | (2006.01) | |
| G06K 9/20 | (2006.01) | |

(Continued)

(52) U.S. Cl.
CPC ............. *G06T 7/0012* (2013.01); *A61J 7/0084* (2013.01); *G06K 9/2036* (2013.01); *H04N 5/33* (2013.01); *A61J 1/03* (2013.01); *A61J 2200/70* (2013.01); *A61J 2205/20* (2013.01); *A61J 2205/40* (2013.01); *G06K 2209/19* (2013.01)

(58) Field of Classification Search
CPC ..................................... G06K 9/00; G06T 7/00
USPC .................... 382/128–134; 356/301; 424/464
See application file for complete search history.

(56) References Cited

U.S. PATENT DOCUMENTS

| | | |
|---|---|---|
| 3,814,521 A | 6/1974 | Free |
| 4,183,013 A | 1/1980 | Agrawala et al. |

(Continued)

FOREIGN PATENT DOCUMENTS

| | | |
|---|---|---|
| WO | WO 01/59691 A1 | 8/2001 |
| WO | WO 2005/017814 A1 | 2/2005 |

OTHER PUBLICATIONS

International Search Report and Written Opinion from PCT Application No. PCT/IB2011/002813 dated May 16, 2012.

(Continued)

*Primary Examiner* — Abolfazl Tabatabai
(74) *Attorney, Agent, or Firm* — Wolf, Greenfield & Sacks, P.C.

(57) ABSTRACT

A pill identification system includes a device which is configured to collect three-dimensional image data of surfaces of one or more pills, generate geometric features of the pill(s) from the three-dimensional image data, and identify the pill(s) using the geometric features. In some embodiments, the identified pills can be verified for patient administration by comparing the identified pills to prescription information.

43 Claims, 14 Drawing Sheets

(51) Int. Cl.
*H04N 5/33* (2006.01)
*A61K 9/20* (2006.01)
*G01J 3/44* (2006.01)
*A61J 1/03* (2006.01)

(56) References Cited

U.S. PATENT DOCUMENTS

| | | | |
|---|---|---|---|
| 6,330,351 | B1 | 12/2001 | Yasunaga |
| 6,535,637 | B1* | 3/2003 | Wootton et al. ............... 382/190 |
| 7,028,723 | B1 | 4/2006 | Alouani et al. |
| 7,218,395 | B2* | 5/2007 | Kaye et al. ................... 356/301 |
| 7,747,454 | B2 | 6/2010 | Bartfeld et al. |
| 8,247,139 | B2* | 8/2012 | Satou et al. ....................... 430/1 |
| 2002/0099467 | A1 | 7/2002 | Sleep et al. |
| 2007/0189597 | A1* | 8/2007 | Limer et al. .................. 382/153 |
| 2007/0257934 | A1 | 11/2007 | Doermann et al. |
| 2010/0042430 | A1 | 2/2010 | Bartfeld |

OTHER PUBLICATIONS

International Preliminary Report on Patentability from PCT Application No. PCT/IB2011/002813 dated Apr. 30, 2013.

Gorpas et al. "A binocular machine vision system for three-dimensional surface measurement of small objects", Computerized Medical Imaging and Graphics, Pergamon Press, New York, NY, US, vol. 31, No. 8, Oct. 23, 2007, pp. 625-637.

Pei Ran Sun et al. "A New Method to Guard Inpatient Medication Safety by the Implementation of RFID", Journal of Medical Systems, Kluwer Academic Publishers—Plenum Publishers, NE, vol. 32, No. 4, Mar. 20, 2008, pp. 327-332.

Hartl, "Computer-Vision based Pharmaceutical Pill Recognition on Mobile Phones", Proceedings of CESCG 2010: the 14$^{th}$ Central European Seminar on Computer Graphics, 8 pages.

European Patent Office, Summons to Oral Proceedings, Application No. 11805585.4, Mar. 23, 2015, 7 pages.

European Patent Office, Communication pursuant to Article 94(3) EPC dated Jun. 3, 2014 from Application No. 11805585.4, 6 pages.

* cited by examiner

MEDICATION IDENTIFICATION AND VERIFICATION

RELATED APPLICATIONS

This Application is a national stage filing under 35 U.S.C. §371 of International Application Serial No. PCT/IB2011/002813, entitled "MEDICATION IDENTIFICATION AND VERIFICATION" filed Oct. 27, 2011, which was published under PCT Article 21(2) in English, which claims priority under 35 U.S.C. §119(e) to U.S. Provisional Application Ser. No. 61/408,289, entitled "BEDSIDE MEDICATION IDENTIFICATION AND VERIFICATION" filed on Oct. 29, 2010, each of which is herein incorporated by reference in its entirety.

FIELD

The present invention relates generally to the methods and apparatuses for reducing medication errors, and more specifically to the identification of pills via feature extraction.

DESCRIPTION OF THE RELATED ART

In healthcare institutions, nurses, doctors and pharmacists dispense medication for patients, and typically organize dosages based on the timing of medication administration. The medications are dispensed into a container based on prescription information issued by the medical staff. Dispensing is labor intensive and error prone, and can result in missed dosages and/or incorrect medications being dispensed. For example, if a patient has two prescriptions—one indicating that medication A should be administered at 4 pm on Mondays and the other indicating that medication B should be administered at 4 pm every day—then the container for 4 pm on Mondays should contain both medications. Common errors may result in only one medication being present in the container, or the wrong number of pills for medication A and/or B, or even the inclusion of a third medication which should not be included.

Once the medication has been placed in the container, a nurse or other medical professional brings the container to the patient as the scheduled administration time approaches. Depending on the workflow in the hospital, the elapsed time from dispensation to administration can be several hours. During this time period, a doctor may decide to change the prescription(s) or add new prescriptions, and unless extra precautionary steps are taken to update the contents of the medication containers which have already been dispensed, medication may be administered in accordance with an outdated prescription.

Once the container reaches the patient and the nurse determines that the administration time has been reached, the nurse verifies that the correct medications are being given to the patient. Typically, this verification is based on information the nurse can obtain from the patient's chart which lists all of the prescriptions for the patient. This verification typically involves the nurse comparing the contents of the container with the prescriptions. This verification procedure is often performed under severe time pressure. FIG. 1 shows a flowchart 100 of typical steps performed from the time of a medication being prescribed through administration of the medication to the patient.

U.S. Hospitals provide medications to approximately one million patients daily. Some estimates are that an average of twenty people die per day due to medication errors in U.S. hospitals. According to the Institute of Medicine, approximately 1.5 million people are injured by medication errors in the U.S. each year and the direct cost of these types of mistakes is estimated to be $15-20 billion per year in Europe and the U.S. Ensuring that each patient receives the right dosage at the right time can be a complicated and error-prone process. During administration of medication in hospitals, nurses often deliver up to 100 dosages within thirty minutes at multiple times during the day. With a large number of different medications, often with similar features, on average one medication error is made per patient per day.

Under the leadership of the Institute of Medicine and other authorities, every hospital in the western world is now aggressively seeking a solution to this missing link in medication safety. Research shows that hospitals can prevent 50% of these errors at bedside. To achieve this reduction, nurses should be provided with tools to safely deliver medication within their tight time constraints.

One currently-used process includes placing a barcode on each individual pill prior to the pill reaching the patient administration stage. At bedside, the nurse scans the barcode on every pill for every patient every time medication is administered. This process can be costly, requiring an initial capital outlay of $1-2 million per hospital for various barcode machines and automated equipment. At present, approximately 1% of hospitals have adopted such a system.

SUMMARY

According to embodiments of the invention disclosed herein, one or more medications are verified, often at bedside, through pill feature extraction and/or analysis. The pill features may be identified using three-dimensional data, such as a 3D point cloud, acquired by various systems and/or methods.

According to one embodiment, a system includes an imaging device configured to collect surface image data of one or more pills, and a controller configured to control the imaging device to collect the image data of the one or more pills. The system is configured to generate a three-dimensional point cloud using the surface image data of the one or more pills, and is also configured to generate geometric data for each pill from the three-dimensional point cloud. The system is further configured to determine the identity of each of the one or more pills based on at least the geometric data generated from the three-dimensional point cloud.

According to another embodiment, a method includes collecting surface image data of one or more pills, generating a three-dimensional point cloud of surface data for each of the one or more pills, and generating geometric data from the three-dimensional point cloud data. The method also includes identifying the one or more pills based on at least the geometric data generated from the point cloud data.

According to a further embodiment, at least one computer-readable storage medium has computer-readable instructions for performing steps of a method of identifying a pill based at least on geometric data received from an imaging device. The method includes receiving three-dimensional geometric data regarding a pill, the three-dimensional geometric data having been generated from a three-dimensional point cloud of the pill. The method also includes determining that the geometric data for the pill matches a pill geometry of a known pill, and producing identification information regarding the pill based on at least the determination that the that the geometric data for the pill matches the pill geometry of a known pill.

According to yet another embodiment, a method of performing surface scanning includes projecting a laser light pattern onto a three-dimensional surface, the laser light comprising laser light within the red and/or infrared spectrum, and receiving, with a camera, laser light reflected from a portion of the three-dimensional surface. The method further includes using light only from a green and/or blue spectrum of the reflected light to determine the location of the portion of the three-dimensional surface from which the reflected light reflected.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2a is a front view of a medication identification apparatus according to one embodiment;

FIG. 2b is a cross-sectional side view taken along line A-A in FIG. 2a;

DETAILED DESCRIPTION

This disclosure recognizes the importance in providing a pill identification system which is timely, accurate and flexible. In some embodiments, a pill identification system includes a device which is configured to collect three-dimensional image data of surfaces of one or more pills, generate geometric features of the pill(s) from the three-dimensional image data, and identify the pill(s) using the geometric features. To collect three-dimensional surface image data with a precision that permits sophisticated analysis of geometric features, various imaging techniques may be used, such as structured light scanning and stereoscopic imaging as but two examples. These techniques permit, in some embodiments, analysis of raised or recessed pill inscriptions, surface texture, dividing line features (such as score line thickness), pill volume, pill shape, and edge shapes.

For example, in some embodiments a laser scanner may be used to create a 3D point cloud of pill surface data. The 3D point cloud may have a sufficient density to permit the extraction of surface features from a scan of a single pill at an precision that is not possible with previous techniques, thereby allowing accurate pill identifications.

The flexibility of a pill identification system can be important because some patients are administered a single pill from among over a thousand possible pills, while other patients are administered numerous pills of different types at a given administration time. Accordingly, a system which can identify a type of pill based on a scan of a single unit of that type of pill, as well as identify a number of different pills which are mixed together, can be advantageous.

Figure 1:
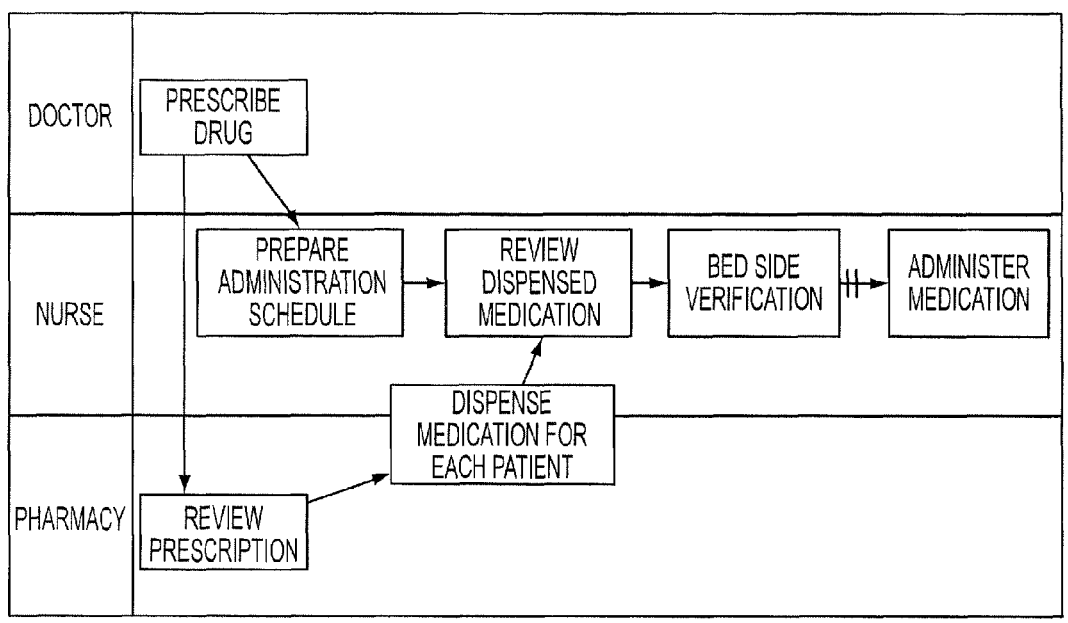
FIG. 1 is a flowchart of a typical, known method of prescribing medication and administering the medication to a patient.

Embodiments of the devices and methods disclosed herein may be useful at different stages of the process of prescribing and administering medications. For example, with reference to FIG. 1, an identification and/or verification device may be used when medication is dispensed, when dispensed medication is reviewed, and/or when medication is verified at bedside.

For purposes herein, the term "pill" is intended to include any type of medication having a solid or semi-solid outer surface which maintains its shape during normal handling. For example, the term "pill" is intended to include tablets, capsules, caplets, lozenges, suppositories, chewing gum pieces, as well as other types of medication intended for patient ingestion.

Figure 2:
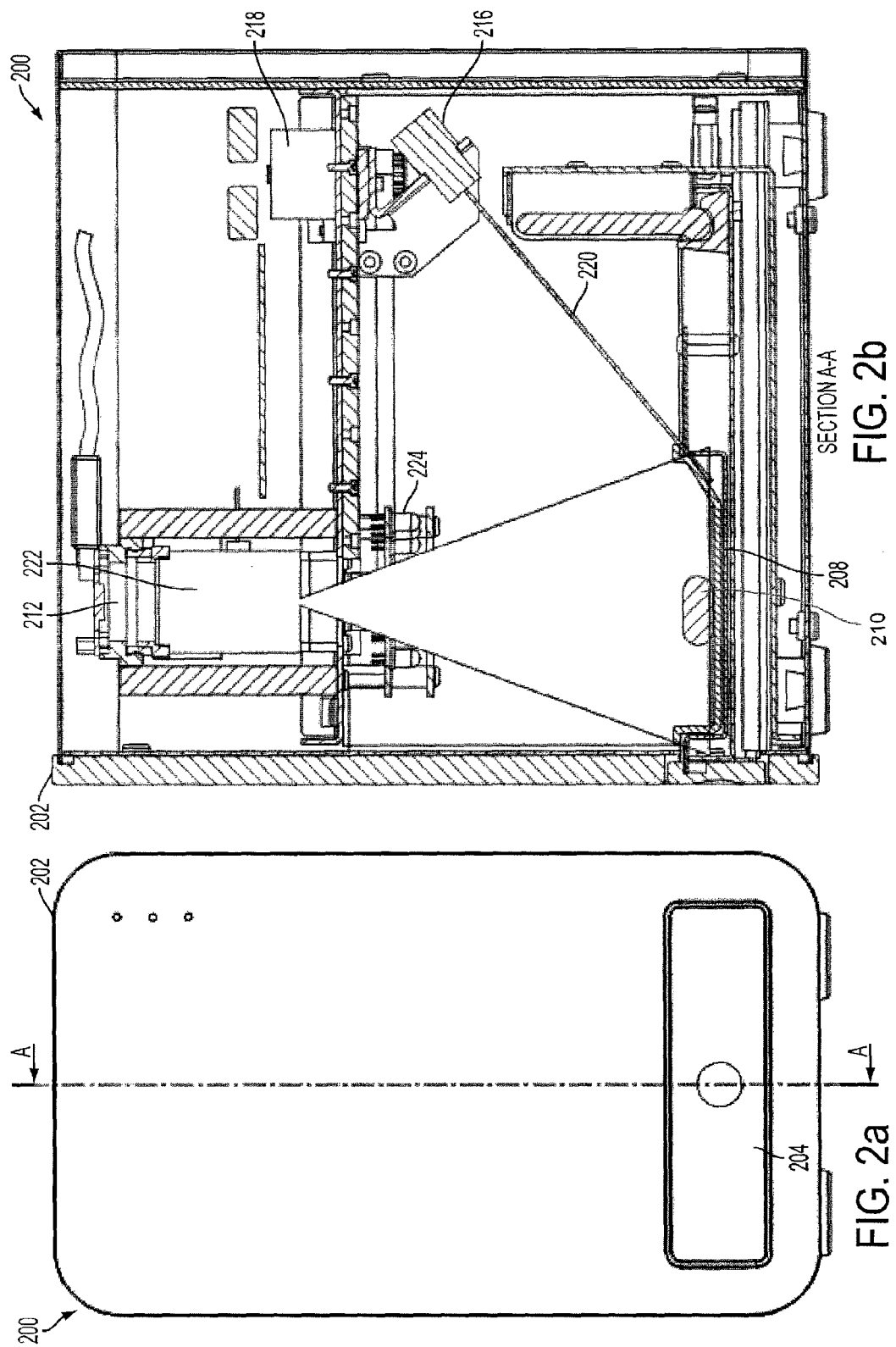

One embodiment of an apparatus 200 configured to collect three-dimensional data of surfaces of one or more pills is shown in FIGS. 2a and 2b. In the front view of FIG. 2a, a housing 202 substantially encloses apparatus 200, and includes a drawer opening 204 for the insertion and removal of a pill tray 208. As can be seen in the cross-sectional side view of FIG. 2b, a drawer 206 includes a pill support such as pill tray 208 to support one or more pills 210 within apparatus 200.

A camera 212 is situated relative to pill tray 208 so that camera 212 is able to capture images from the entire surface of pill tray 208 where pills may be present. A vibrator (not shown) may be included to vibrate pill tray 208 to separate overlapping pills, though in some embodiments, a vibrator may not be present. The vibrator may be in communication with a controller such that the vibrator is only used if requested by the controller.

A laser source 216 is positioned such that laser light is directed at pills on pill tray 208 at an angle relative to the camera. In this manner, triangulation may be used to generate three-dimensional surface data. A laser controller 218 controls the direction of a laser beam 220 to direct laser light across the pill tray area. In some embodiments, a single dot of laser light is projected onto the pill tray and swept sequentially across the pill tray surface. Light reflected from the surface of pill tray 208 and any pill(s) on pill tray 208 is captured by camera 212.

A line of laser light may be projected on pill tray 208 and swept across the relevant area in some embodiments. In still other embodiments, two-dimensional patterns of structured light such as a grid pattern of lasers or shadows may be projected on the pill tray surface. In some embodiments, laser source 216 is a Cameo 650 nm, 3 mW laser made by Global Laser Ltd., but any suitable laser source may be used. The camera is a DFM22BUC02-ANG camera made by The Imaging Source in some embodiments, though of course any suitable camera may be used. A lens 222 for the camera may be a DF6HA-1B made by Fujinon, though any suitable lens may be used.

Apparatus 200 also may include one or more lights 224 configured to illuminate pill tray 208. This illumination creates shadows of the pills on the pill tray, and images of these shadows may be recorded by camera 212 and/or by a separate camera (not shown). Lights 224 may be positioned so that the pills are illuminated from different directions (either simultaneously or separately), which permits calculation of the shape and size of the pills and/or surface features. Lights 224 may include lights of different colors, including white light, ultraviolet light, red light, green light, blue light, and/or infrared light. In some embodiments, Raman spectroscopy and/or infrared spectroscopy may be used as part of identifying the pills present on the pill tray.

A scale (not shown) may be included to provide information regarding weight of one or more pills, though in some embodiments, a scale is not included.

In alternative embodiments, apparatus 200 may not include a pill tray or any pill support. For example, apparatus 200 may have an open bottom which can placed over a group of pills that are resting on a surface such as a table. In some embodiments, the apparatus may be configured as an open device where ambient light is not prevented from reaching a group of pills to be examined. In some cases, the open device may include a pill support, while in other cases, the open device may not include a pill support, and the device may be configured to examine pills that are resting on a table, a tray, or other suitable surface.

Figure 3:
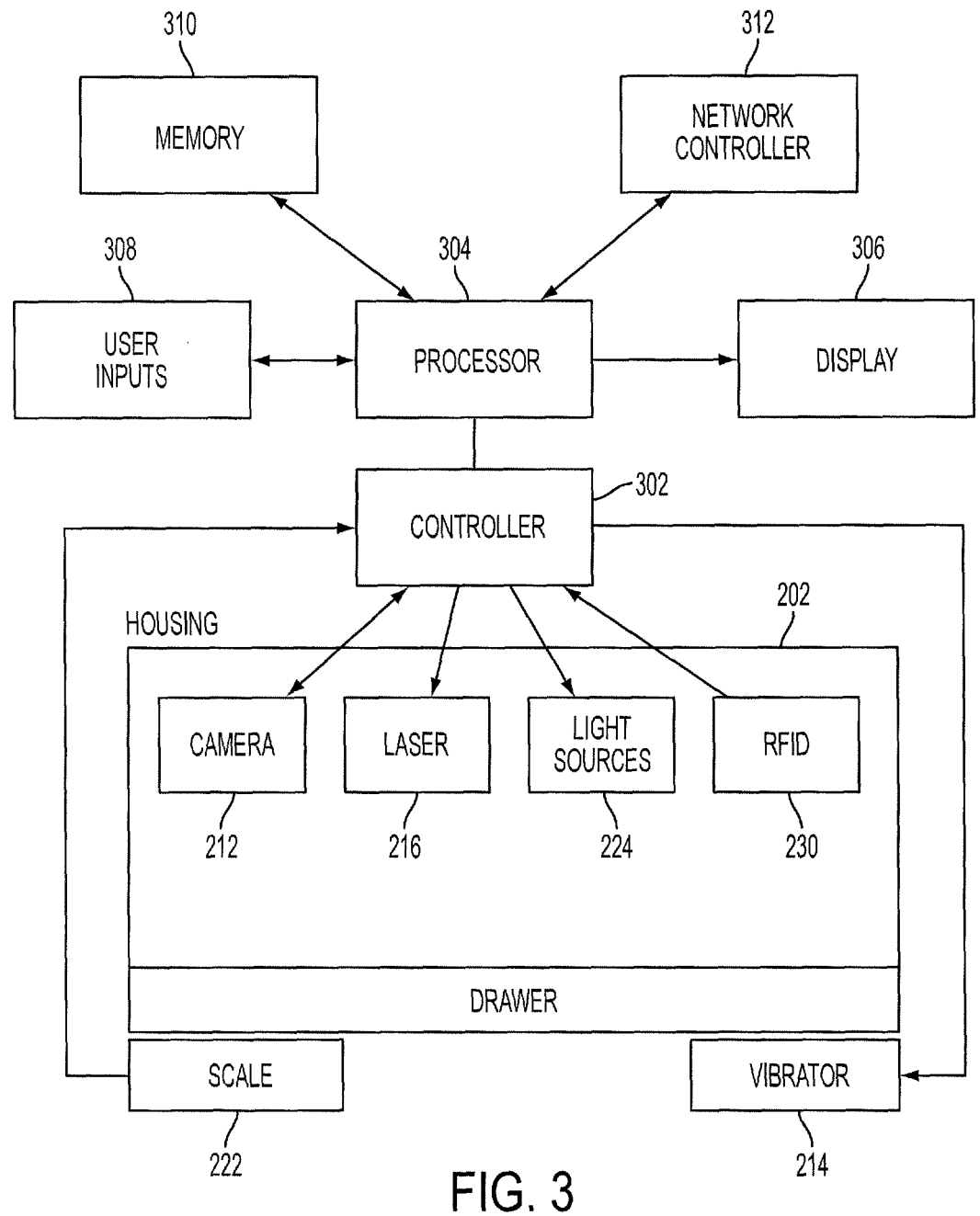
FIG. 3 is a block diagram showing a medication identification apparatus and associated computer hardware components.

FIG. 3 shows a schematic block diagram of a pill identification apparatus in communication with a controller 302, which in turn is in communication with a processor 304. Processor 304 may be part of a computer which includes a display 306 and user inputs 308. The computer may have a memory 310, and may further be connected to a network controller 312. In some embodiments, some or all of the various computer components are physically integrated with the pill identification apparatus such that the apparatus can operate as a standalone unit. In other embodiments, the pill identification apparatus is connectable to existing computers, such as a computer at a patient bedside, and therefore the pill identification apparatus does not necessarily include each of the computer components shown in FIG. 3.

An RFID sensor 230 may be included within the pill identification apparatus as part of a system of identifying pills or identifying patients.

Pill Identification and Verification

Figure 4A:
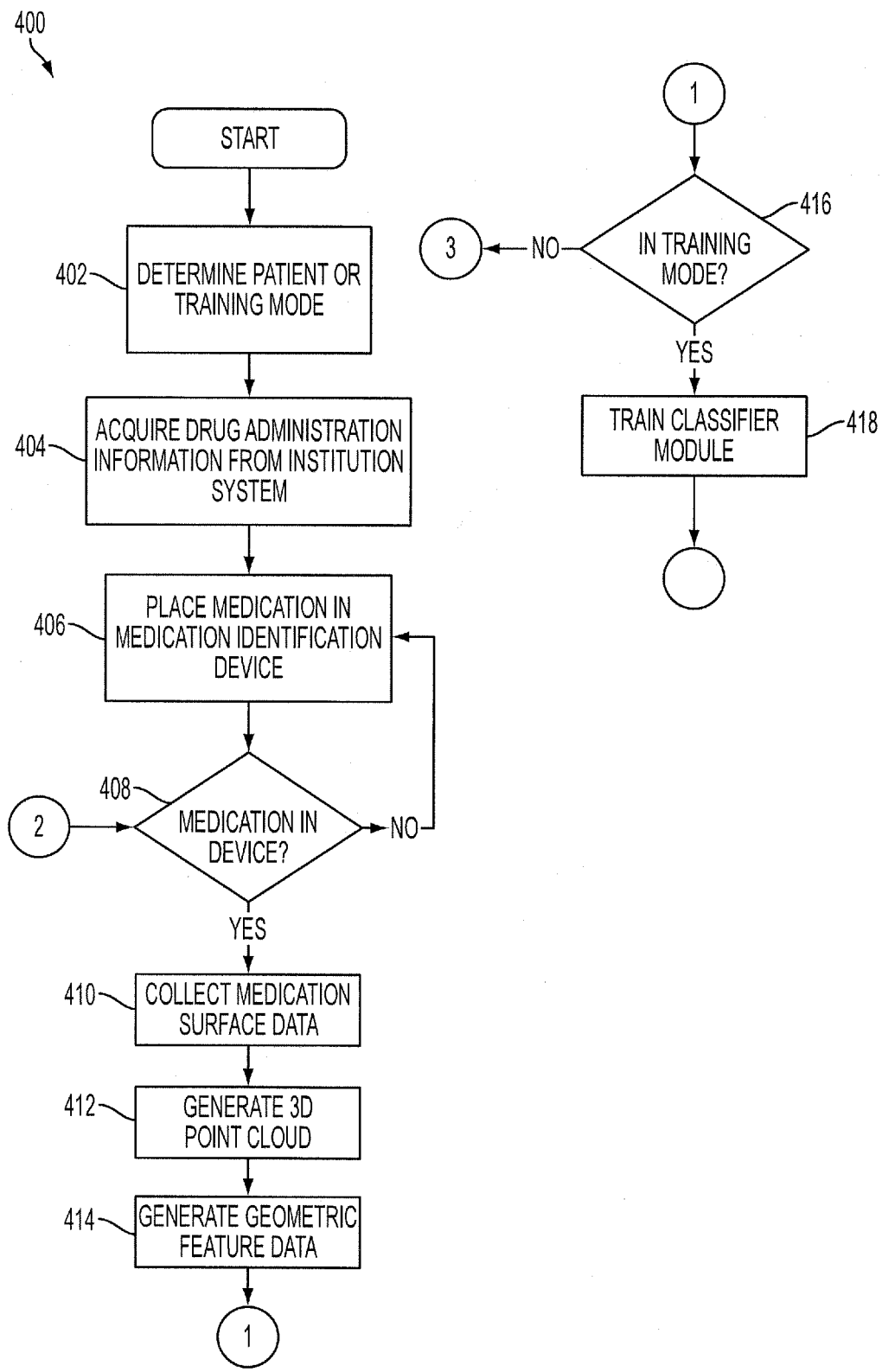
FIGS. 4a and 4b show a flowchart of a method of identifying medications, according to one embodiment.
Figure 4B:
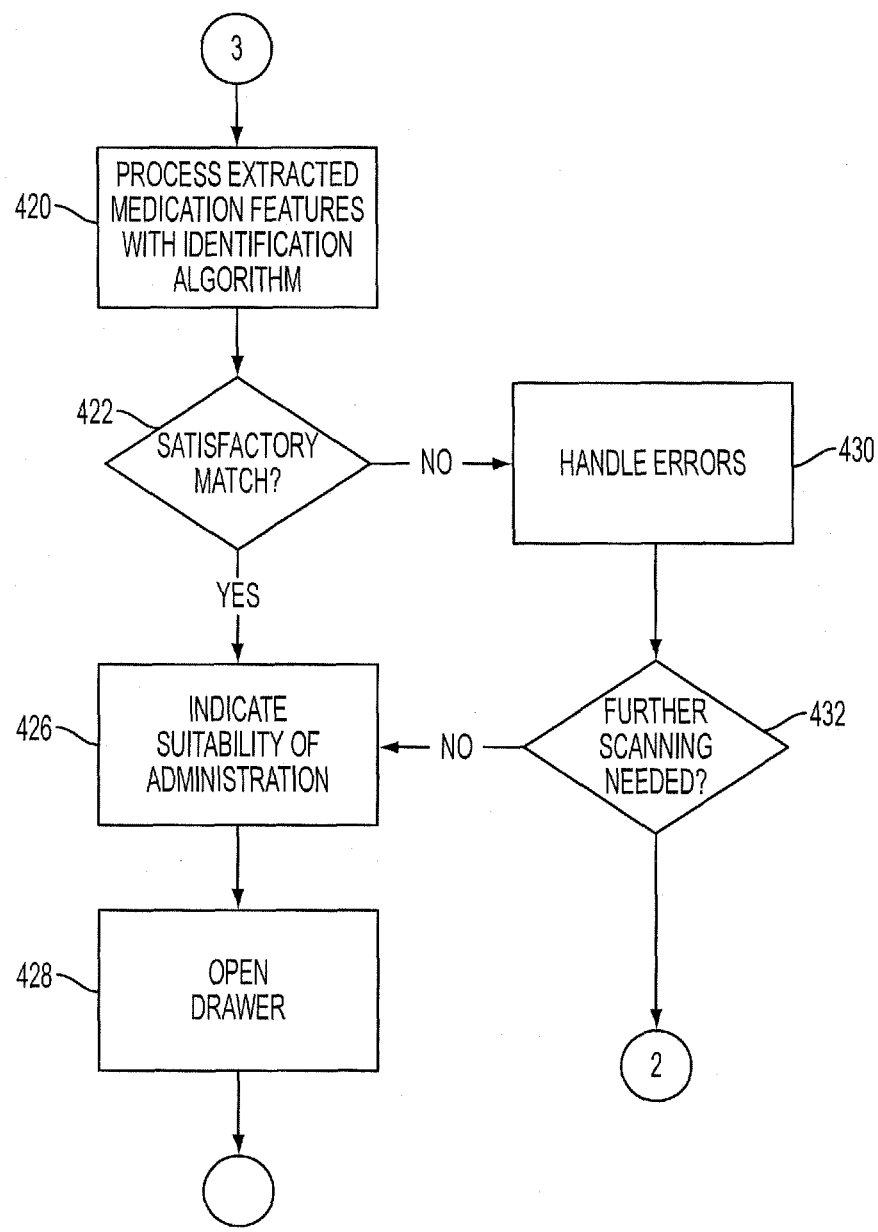

Turning now to an overall method of identifying pills and verifying that the identified pills can be administered to a patient, FIGS. 4*a* and 4*b* show a flowchart of one embodiment of such a method. Of course other methods may be used, including methods which do not include every step shown if FIGS. 4*a* and 4*b*, and methods which include different or additional steps as compared to FIGS. 4*a* and 4*b*.

A patient is identified in an act 402 so that the correct medication prescription information can be retrieved from a suitable source, such as a prescription database within an institution's (e.g., hospital's) information system. This patient identification may be performed using names, patient identification numbers, barcodes, or any other suitable procedure. If the system is in training mode, the act of identifying a patient is not performed. The drug administration information for the identified patient is acquired from the hospital information system (act 404). The nurse locates the medication which has been dispensed and places the medication in the medication identification apparatus (act 406). Once the medication drawer is determined to be closed, the medication identification apparatus confirms that medication is present in the apparatus (inquiry 408). Data regarding the pills is then collected in an act 410, including three-dimensional surface data. In some embodiments a 3D point cloud is generated (act 412). Based on the collected three-dimensional surface data and/or the 3D point cloud data, geometric features of the pill(s) are extracted in an act 414. Details regarding certain implementations of geometric feature extraction is provided further below with reference to FIG. 6.

A determination is made whether the system is in training mode identification mode (inquiry 416). If the system is in training mode, all medications on the pill tray are assumed to be of the same type, and generated geometric features are processed to train and calibrate a classification module (act 418).

If the system is in identification mode, the extracted medication features are processed by an identification module in an act 420. If the identification module is able to suitably identify each medication (inquiry 422), the success of identification and/or the medication identification information is indicated to the user. In some embodiments, the identified medication can be compared to a list of prescribed medications (act 424), and the user may receive an indication as to whether the pill or pills that were placed in the apparatus are suitable for administering to the patient (act 426). The indication of successful identification and/or the indication of the suitability of administering certain medications may be provided on a display screen that is part of the identification apparatus. In some embodiments, the option of a printout may be provided. In still further embodiments, identification information may be sent to a device that is separate from the identification apparatus.

Once the identification process is complete, the drawer with the pill tray may be opened automatically by the apparatus (act 428). The apparatus may include an override input button which allows the user to open the drawer even if there has not been a successful identification and/or match with prescription information. Of course, in some embodiments the drawer is manually operated.

In situations where all of the pills have not been identified, or the pills do not match the prescription, error handling may be performed in an act 430. Error handling is discussed below with reference to FIGS. 5*a*-5*e*. If further scanning is required or requested as a result of error handling, the method can be returned to inquiry 408 (see FIG. 4*a*).

User Interface

Figure 5A:
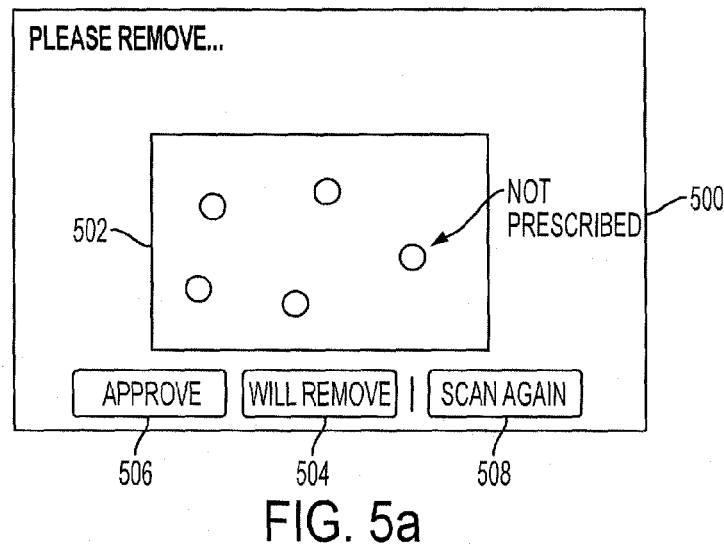
FIGS. 5a-5f show several modes of a user interface for use with a medication identification apparatus, according to one embodiment.

Each of FIGS. 5*a*-5*f* shows a different display/input mode of one embodiment of a user interface 500 for a pill identification and verification device. FIG. 5*a* shows a mode where the device has successfully identified each pill examined by the device, but it has been determined that one or more of the pills should not be administered to the patient. For example, a processor housed within the device may have determined that one of the pills examined by the device is a pill that was not prescribed, or an extra pill for a prescribed medication is present. An image 502 of the pills is displayed to the user, and the offending pill (or pills) is noted in any suitable manner. The user can select a "will remove" button 504 and remove the pill. Or, if the user is aware of a recent or revised prescription for the offending pill, the user can select an "approve" button 506 to override the device and indicate that the pill will be administered to the patient. The user also may request a reexamination of the pills by selecting a "scan again" button 508.

Figure 5B:
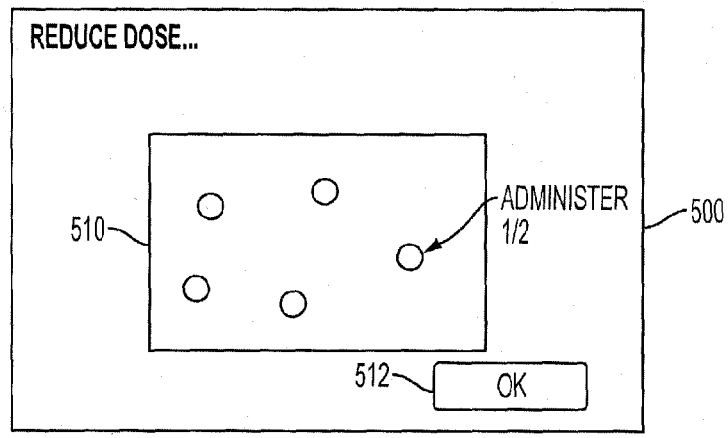

FIG. 5*b* shows a mode of user interface 500 when the device has identified all the examined pills, but has determined that only a portion of one of the pills should be administered according to a prescription. The relevant pill can be noted in any suitable manner on an image 510. The user can acknowledge this information by selecting an "OK" button 512, or, as shown in FIG. 5*a*, an "approve" button and/or a "scan again" button may be provided.

Figure 5C:
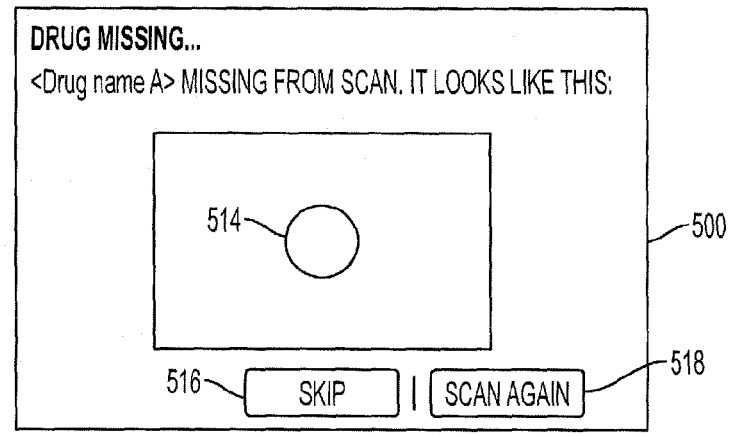

FIG. 5c shows a mode of user interface 500 when the device has failed to locate a pill that should be present according to prescription data. The user is presented with a stock image 514 of the missing pill. The user can select a "skip" button 516 to acknowledge and proceed, or the user can request a rescan by selecting "scan again" button 508.

Figure 5D:
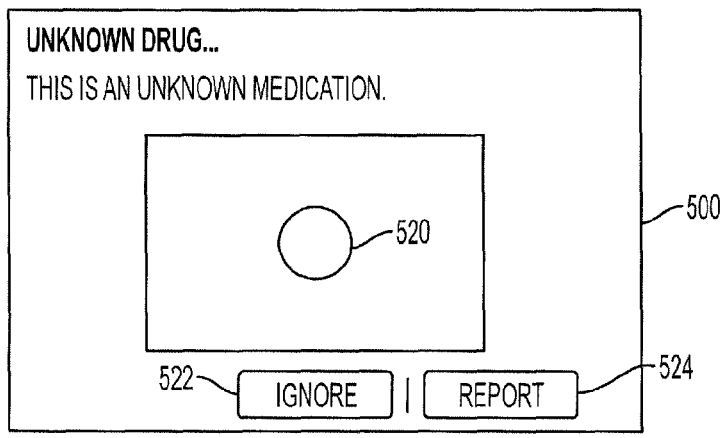

FIG. 5d shows a mode of user interface 500 when the device fails to identify one of the examined pills. An image of the unidentified pill 520 is displayed to the user. The user can choose to acknowledge and proceed by selecting an "Ignore" button 522. Or a "Report" button 524 can be selected to report the new medication to administrative personnel.

Figure 5E:
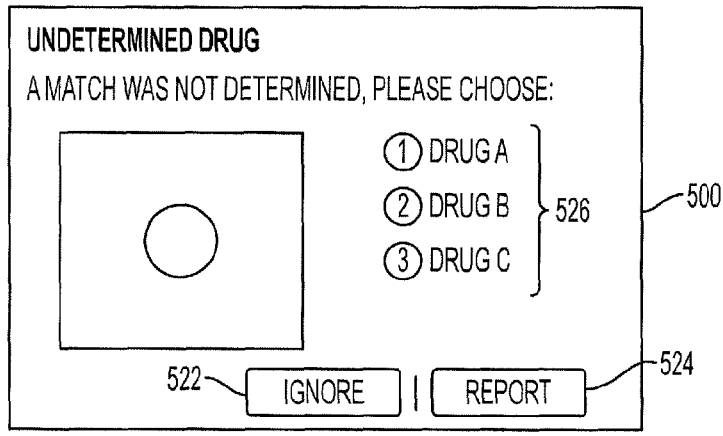

FIG. 5e shows a mode of user interface 500 when the device is unable to conclusively identify an examined medication. Possible matches 526 are displayed to the user and the user can select one of the possible matches. The user can also choose to ignore this event or report the event.

Figure 5F:
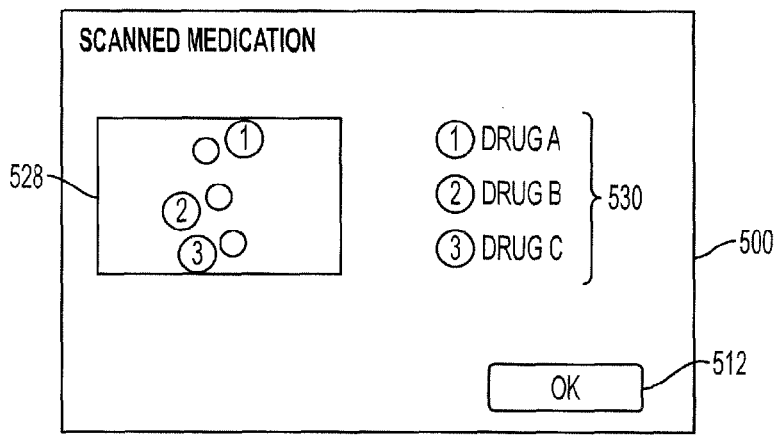

FIG. 5f shows a mode of user interface 500 when all of the examined medications have been identified and verified as approved for patient administration. A display 528 of the each of the medications may be shown along with a list 530 of identified and verified. The user may acknowledge and proceed by selecting "OK" button 512.

Collection of Three-Dimensional Data and Extraction of Geometric Features

Figure 6:
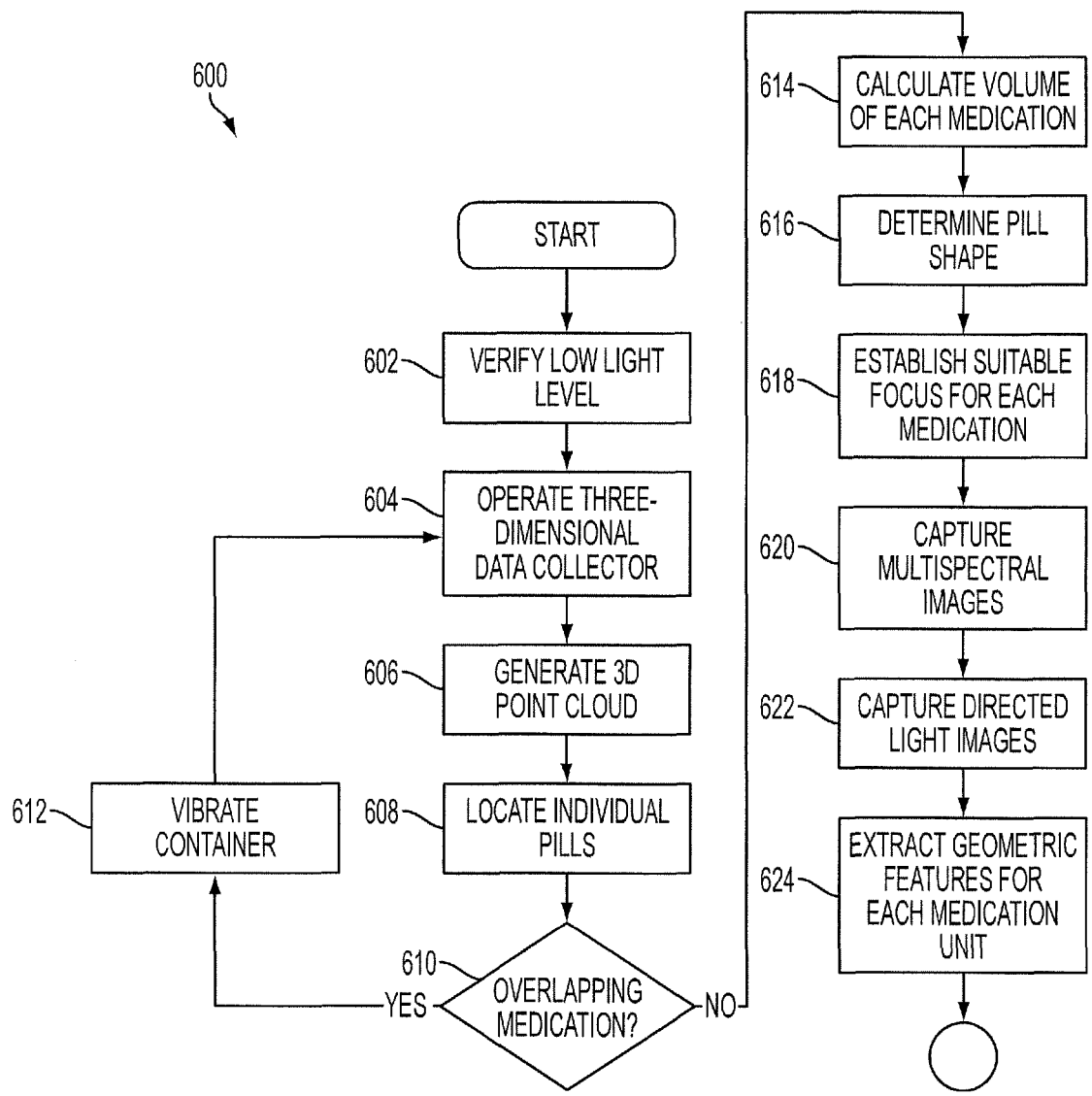
FIG. 6 shows a flowchart of a method of collecting three-dimensional surface data of a pill and extracting geometric features from the data, according to one embodiment.

FIG. 6 is a flowchart 600 of a set of instructions which may be executed by the identification system to collect three-dimensional surface data and extract geometric features therefrom. Before surface data is collected, a suitably low level of external light is verified (602). An image collection act, such as the operation of a laser scanner, is performed in an act 604. In an act 606, a 3D point cloud is generated from the data collected in act 602. Location of the various pills is performed in an act 608, and a check for overlapping pills is made in an inquiry 610. If pills are found to be overlapping, the pill tray is vibrated in an act 612 so that the pills separate.

Once all of the pills are found to be not overlapping, data from the generated 3D point cloud may be used to calculate the volume of each pill (act 614). The 3D point cloud contains information about the distance from the surface of the pill to the surface of the pill tray (or other pill support). Using this information it is possible to calculate the volume of the pill using standard geometric calculations. The overall shape of each pill also may be determined using the data from the 3D point cloud in an act 616. In some cases, the shape of a two-dimensional projection of the pill may be sufficient for determining the identity of a pill, while is other cases, a determined three-dimensional shape may be used to identify a pill.

The 3D point cloud also permits the calculation of the distance from the camera to the surface of the medication, and this information may be used to calibrate the camera and lens assembly to improve focus when capturing images. A suitable focus for each pill is established in an act 618. Because some pills can be distinguished by analyzing information on the surface of the medication, such as letters and numbers that have been printed on the surface, establishing a suitable focus for each medication can be important. If pills have different heights such that the distances between the camera and the pills vary significantly, multiple images may be captured, with a suitable focus setting for each pill. For example, one image may be recorded for each height level which has been identified, and the lens focus may be adjusted for each image.

Color may be used in some embodiments as part of identifying pills. The colors captured and analyzed by embodiments disclosed herein may be sensitive to the light which illuminates the pills. Exposing the pills to different lighting during image recordation can provide a more robust color analysis. In some embodiments, pills are sequentially exposed to different lighting, e.g., first red light, then blue light, and finally green light, and a multispectral image or multispectral images are captured (act 620). Other sequences and other suitable types of light, including light which is not visible to the human eye (e.g., infrared and ultraviolet), may be used in various embodiments. In some embodiments, a light generator may be used to expose pills to all wavelengths simultaneously, and a high quality camera and can be used to record the output.

Pill surfaces may include geometric features such as raised areas, or grooves or other recesses which may be used to identify pills. In some embodiments, the precision of a dense point cloud permits an analysis of surface features which can distinguish types of pills from one another. For example, in some embodiments, the width of a dividing line (e.g. score line) may be used to identify a pill.

In some embodiments, directed light may be used to form pill shadows. For example, in an act 622, pills are exposed to light which is projected from an angle relative to the camera, and thus a shadow is visible to the camera. Triangulation calculations may be used to determine the shape and/or size of surface irregularities of the pills based on the shadow. In some embodiments, light is sequentially projected from two or more different directions by multiple light source, and two or more images are captured.

In an act 624, various further geometric features are extracted from the generated information. For example, curvature of pills surfaces and/or features of grooves may be determined from the 3D point cloud. Raised or recessed inscriptions on pills surfaces may be extracted. An overall area and/or overall volume of each pill may be generated from the 3D point could. In some embodiments, certain measurements such as diameter, length, width, height, edge curvatures may be determined based on the 3D point cloud.

For each pill, all of the features generated during the method, including geometric features, may be stored for use in identifying the pill. As discussed below, not all of the generated features are necessarily used to identify each pill, and different features may be used for different pills, even if the pills are examined at the same time.

Pill Identification

Various methods may be used to identify one or more pills. In some embodiments, a flowchart of rules may be applied to extracted pill features to identify pills. In other embodiments, pill features may be compared to a database of known features for a set of pill types which could be matched to the examined pills. In still further embodiments, an artificial neural network may be used to formulate an identification algorithm.

Regardless of the method used to identify an examined pill using the extracted pill features, a tiered analysis may be used in some embodiments. With a tiered analysis, a limited set of extracted features are analyzed, and if the features can be matched to exactly one pill type candidate, then it is concluded that a satisfactory match has been made and the analysis of the features of that particular examined pill is stopped. If, however, the analysis of a first set of features results in more than one possible match, further analysis is conducted. For example, a first limited set of extracted features for a scanned pill may include a color, a pill volume, and a total area of a two-dimensional projection of the pill. If an analysis of these features leads to four candidate matches, further analysis would be conducted. This further analysis may include a review of the presence of a dividing line and the shape of a two-dimensional projection of the pill. After the analysis of this additional second set of features, the four candidate matches may be reduced to one, and therefore a match is made and the pill is considered to be identified. In this manner, computing resources can be efficiently used when identifying the pills.

In some embodiments, pill features, including geometric features, may not be extracted from a 3D point cloud until such a feature is requested by a pill identification algorithm or module. For example, a pill identification algorithm may analyze a first set of geometric features and recognize that further features are needed to distinguish from among a set of candidate pill matches. The pill identification algorithm may request certain features, and the algorithm for extracting these features may executed on the stored 3D point cloud or other pill examination data. The newly extracted features are then sent to the pill identification algorithm.

Pill Verification

Once each of the pills has been identified, the group of pills can be compared to a list of prescribed pills to check whether the identified pills are suitable for patient administration.

In some embodiments, identification and/or verification steps may be performed by a processor which is remote from the device which examines the medication to collect three-dimensional data of the pill surfaces. For example, in some embodiments, a laser scanning device may be used to collect three-dimensional data for a number of pills, and the data may be sent to a remote processor for analysis. The data may be sent wirelessly, or via a wired network, and/or may include use of the Internet as part of the transmission. The pill identification and/or the verification of the suitability of administering the identified pills may be performed by the remote processor, and the results may be sent back to the laser scanning device for display to the user. Or, in some embodiments, results may be sent to a device that is separate from the laser scanning device.

Exemplary Embodiment

Figure 7A:
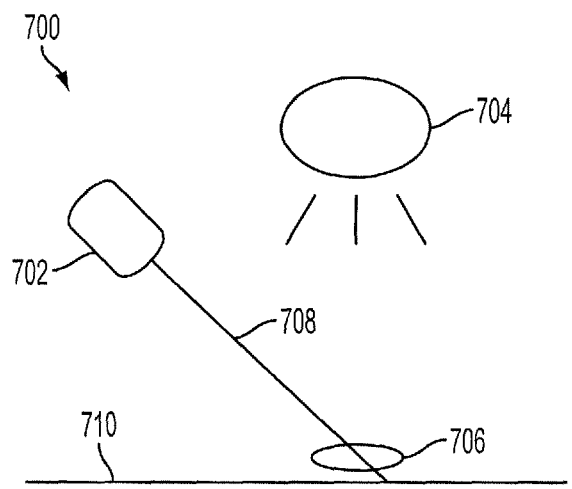
FIGS. 7a-7c are schematics of a laser scanning device configured to capture three-dimensional data from medications.

FIG. 7a is a schematic side view of the interior of one embodiment of a medication identification device 700, showing how a laser generator 702 and a camera 704 operate together to capture three-dimensional data regarding a pill 706 (or multiple pills). Laser light 708 is directed at a pill support surface 710 at an angle relative to the camera position in order to enable triangulation calculations. In other embodiments, a shadow grid, multi-spectral overlay, or stereoscopic imaging may be used to collect three-dimensional data regarding pill 706 FIGS. 7b and 7c further explain this process. The same results can be achieved by someone skilled in the art of computer vision by using other known methods, such as shadow grid, multi spectral overlay or stereoscopic imaging.

Figure 7B:
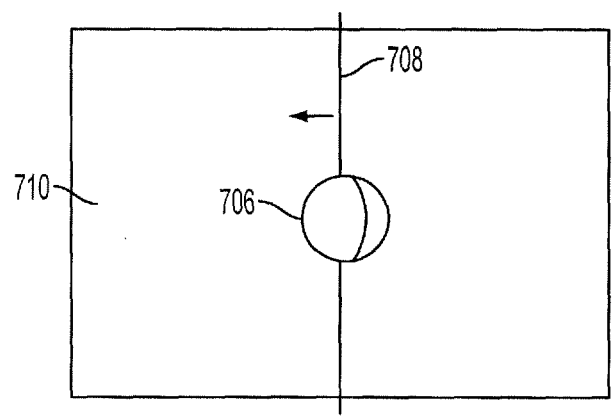

FIG. 7b is a top view of a single image of pill support surface 710 depicting how laser light 708 bends as a result of the shape of pill 706 when viewed from the camera viewpoint Using triangulation calculations and observing only the shape of the laser light as it falls on the surface of the medication and the medication container, a 3D point cloud of the contents of the medication drawer may be generated using standard geometric calculations. As the laser light progresses across the pill support surface, images of the reflected light are captured by camera 704. In some embodiments, the camera captures 60 images per second, and the laser light passes across pill support surface 710 at a rate of 3 cm per second. Of course, other suitable capture rates and laser light progression rates may be used.

Figure 7C:
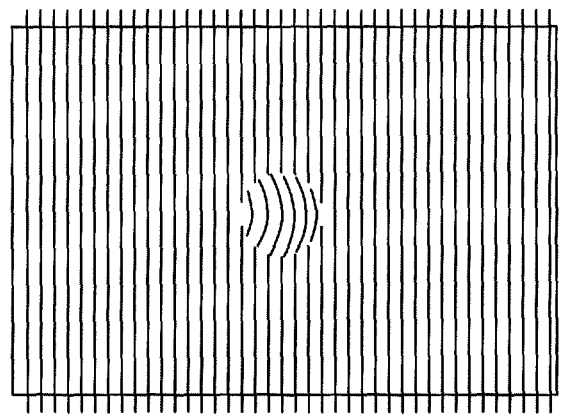

FIG. 7c depicts a composite of multiple images which have been captured with the laser moving across the medication surface, the laser line providing a set of information to be used for building a 3D profile of the medication. The data may be collected by a computer and recorded as data points within a 3D point cloud. FIG. 7c shows forty lines, representing the location of the laser as the camera captured forty separate images. The location of the medication can be determined by analyzing the irregularities of the recorded laser lines. Knowing the angle of the laser permits triangulation software to accurately determine surface locations on the pill. As discussed above, features of the pill, such as height, shape, etc. can be generated from this surface location data.

Figure 8:
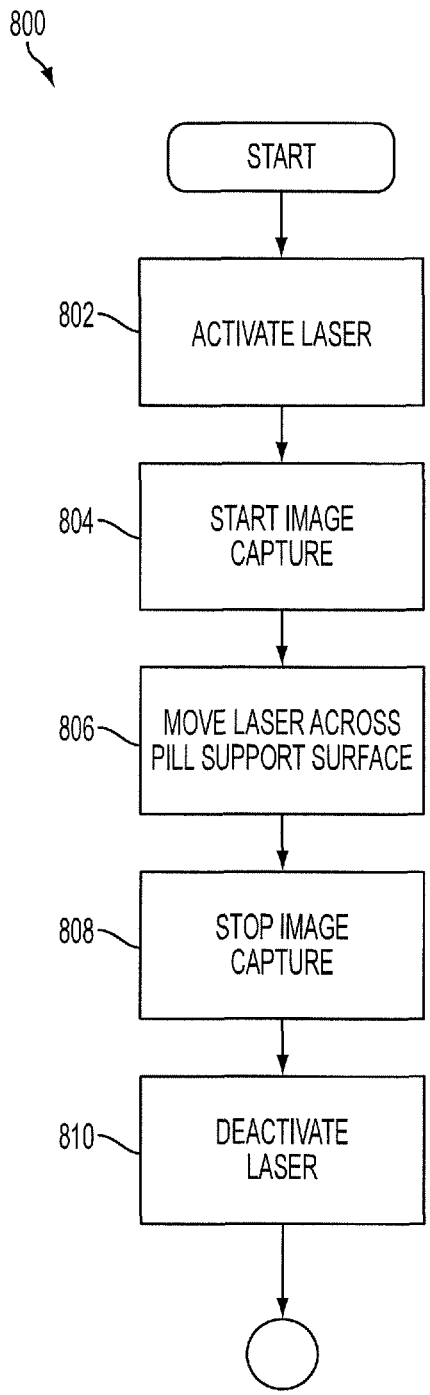
FIG. 8 shows a flowchart of a method of collecting three-dimensional data, according to one embodiment.

FIG. 8 shows a flowchart of instructions which are executed by a processor as part of a method 800 of controlling a medication identification device to capture three-dimensional data from one or more pills according to one embodiment. The laser is activated (act 802) and directed at one end of the pill support surface (or other measurement volume). Image capture is started (act 804) and laser light is moved across the pill support surface (act 806). In some embodiments, image recordation occurs at a regular, predetermined rate. In some embodiments, image recordation may occur at an irregular rate. For example, a feedback loop may be used to alter the image capture rate depending on what type of data is being collected. As the laser light passes over areas devoid of pills, a standard image capture rate may be maintained. Once irregularities such as pills are detected, the image capture rate may be increased and/or the laser light movement rate may be decreased. Once the laser light has covered the entire pill support surface, image capture is stopped (act 808) and the laser is deactivated (act 810).

Figure 9:
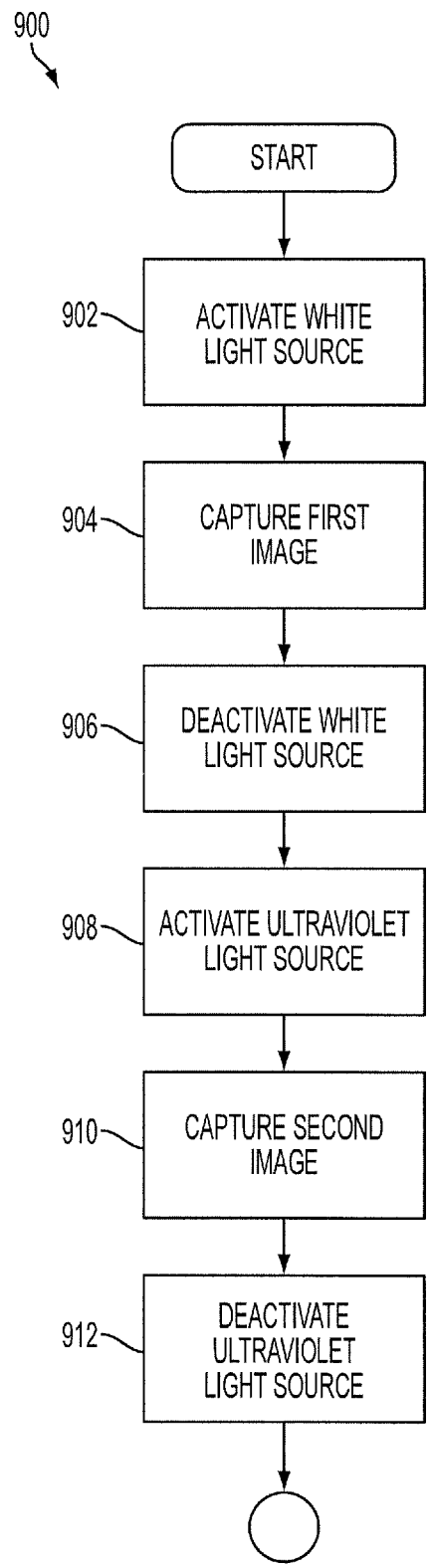
FIG. 9 shows a flowchart of a method of capturing multispectral images of medications, according to one embodiment.

FIG. 9 shows a flowchart describing of instructions which are executed by a processor as part of a method 900 of controlling a medication identification device to capture multi-spectral images. To capture multispectral images, each of a plurality of lights may be used to illuminate the pill support surface sequentially. When a first light is on, a first image is captured. The first light is turned off, a second light is turned on, and a second image is captured. This process can continue with any suitable number of lights. FIG. 8 shows one embodiment where two light sources are used—a white light source and an ultraviolet light source. In some embodiments, four different light sources are used within the same device: a red light source, a green light source, a blue light source and an ultraviolet light source.

In method 900, a first, a white light source is activated in an act 902 to illuminate the pill support surface and any pills thereon. In an act 904, an image is captured with the pill(s) illuminated by the white light. The white light source is then deactivated (act 906), and a second, ultraviolet light source is activated in an act 908. A second image is captured with the pill(s) illuminated by the ultraviolet light. The ultraviolet light source is then deactivated in an act 912. As mentioned above, additional or different light sources may be used as part of method 900.

Figure 10:
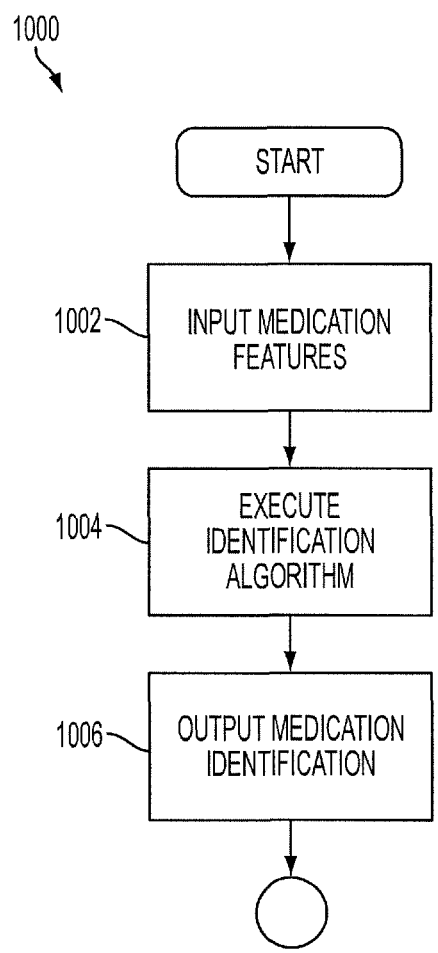
FIG. 10 shows a flowchart of a method of using a medication identification algorithm.

FIG. 10 shows a flowchart of a method 1000 of identifying a medication based at least in part on features extracted from three-dimensional data. In an act 1002, medication features are input into a processor, a computer storage medium, a network, or any other suitable location where the features can be accessed. The medication features may include geometric features which were generated by analyzing three-dimensional data such as a 3D point cloud. Additional features generated during laser scanning or other processes may be input. For example, a color value based on data generated by method 900 may be input. In some embodiments, certain features, such as color or general shape, may be manually input by a user.

In an act 1004, an identification algorithm is executed using at least some of the medication features input in act 1002. As mentioned above, in some embodiments, a subset of inputted medication features may be analyzed, and if a match is not determined, further medication features may be analyzed. The identification algorithm may operate on a single processor or multiple processors. The identification algorithm may comprise a standardized set of rules which are capable of identifying a pill from among a predetermined set of known pills. In alternative embodiments, the identification algorithm may be configured to compare extracted features to known features of known pills and calculate scores of which pill or pills most closely match the examined pill. In other embodiments, the identification algorithm may include a learning algorithm, as discussed directly below.

The identification of the examined medication is output in an act 1006.

Figure 11:
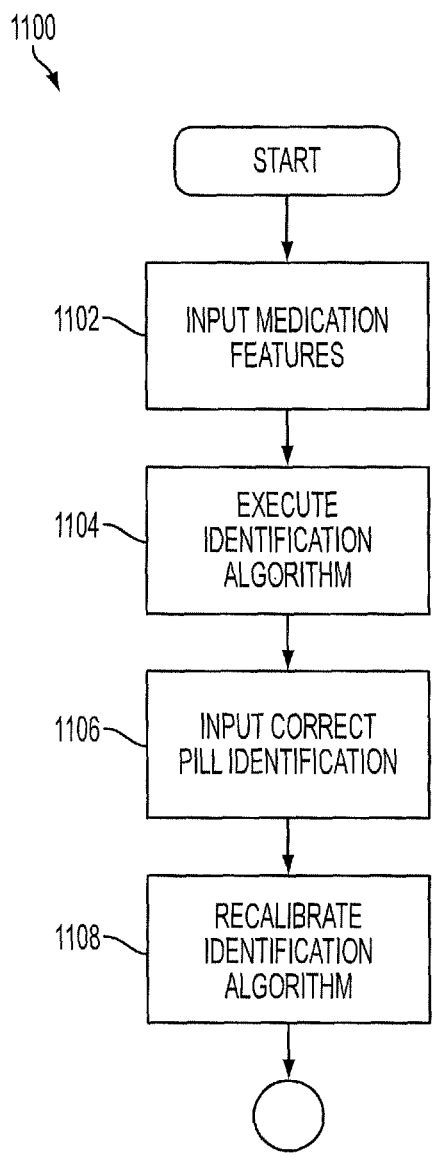
FIG. 11 shows a flowchart of a method of training an identification algorithm, according to one embodiment.

A method 1100 of training a pill identification algorithm is shown in FIG. 11. Medication features are input in an act 1102, and the identification algorithm in its existing form is executed in an act 1104. In an act 1106, the correct pill identification is input to the algorithm. Based on the result determined by the algorithm in act 1104 and the correct pill identification input in act 1106, the identification algorithm is recalibrated in an act 1108. In embodiments where an artificial neural network or other learning program is being used, the recalibration may be performed automatically by the program itself. In other embodiments, the algorithm may be updated by manually revising the algorithm.

Shift in Reflected Spectrum

In some embodiments, a red laser is used to perform surface scanning of pills. Due to the organic nature of the pills, the reflected laser light may shift slightly within the color spectrum. This shift can result in a portion of the reflected light residing in the blue spectrum, the green spectrum, or the blue/green spectrum. The light within the blue and/or green spectrums forms a narrow line. While the light reflected in the red spectrum may be used for collecting three-dimensional data, in some embodiments the light from the blue and/or green spectrums may be used, in some cases exclusively. Because the strength of reflected light is not completely uniform across the thickness of a laser line, a narrow line, such as the line reflected in the blue and/or green spectrums, can provide a more detailed scan of the pills. A method of using light from only the blue and/or green spectrum of the reflected light to gather three-dimensional surface data may be used to collect data from pills, but also may be used to collect three-dimensional data from other objects.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one or more of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments of the invention may be embodied as a computer-readable storage medium or multiple computer-readable media encoded with one or more programs that, when executed on one or more computers or other processors, perform methods that implement the various embodiments of the invention discussed above. Computer readable media may include, for example, a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the embodiments of the invention may be embodied as a computer-readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of embodiments of the present invention need not reside on a single computer or processor, but may be distributed in a modular fashion amongst a number of different computers or processors to implement various aspects of embodiments of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

It should also be understood that, unless clearly indicated to the contrary, in any methods claimed herein that include more than one step or act, the order of the steps or acts of the method is not necessarily limited to the order in which the steps or acts of the method are recited.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
an imaging device configured to collect surface image data of one or more pills;
a controller configured to control the imaging device to collect the image data of the one or more pills;
the system being configured to generate a three-dimensional point cloud using the surface image data of the one or more pills;
the system being configured to generate geometric data for each pill from the three-dimensional point cloud; and
the system being configured to determine the identity of each of the one or more pills based on at least the geometric data generated from the three-dimensional point cloud.

2. A system as in claim 1, wherein the system is configured to determine the identity of each of the one or more pills by applying a set of rules to the geometric data for each pill.

3. A system as in claim 1, wherein the system is configured to determine the identity of each of the one or more pills by comparing the geometric data of each of the one or more pills to a database containing geometric data associated with a plurality of known pills.

4. A system as in claim 1, wherein the system comprises a structured light scanner and the imaging device comprises a first camera configured to capture images of light reflecting from the one or more pills.

5. A system as in claim 4, wherein the structured light scanner comprises a laser light source and the first camera is configured to capture images of laser light reflecting from the one or more pills.

6. A system as in claim 5, wherein the laser light source comprises a 650 nm laser diode module.

7. A system as in claim 4, wherein the first camera is configured to obtain a visual image of the one or more pills when the pills are fully illuminated.

8. A system as in claim 4, wherein the structured light scanner is configured to generate the three-dimensional point cloud data regarding surfaces of the one or more pills.

9. A system as in claim 1, wherein the imaging device comprises a stereoscopic imager.

10. A system as in claim 1, wherein the system is configured to determine the identity of each of the one or more pills additionally based on a measured pill color.

11. A system as in claim 1, wherein the system is configured to determine the identity of each of the one or more pills additionally based on a measured pill weight.

12. A system as in claim 1, wherein the system is configured to determine the identity of each of the one or more pills additionally based on determined pill markings.

13. A system as in claim 1, wherein the geometric data generated from the three-dimensional point cloud comprises pill markings, and the system is configured to determine the identity of each of the one or more pills based on at least the pill markings.

14. A system as in claim 1, wherein the geometric data generated from the three-dimensional point cloud comprises pill surface texture, and the system is configured to determine the identity of each of the one or more pills based on at least the pill surface texture.

15. A system as in claim 1, wherein the system is configured to determine the identity of each of the one or more pills additionally based on information received from a radio frequency identification tag.

16. A system as in claim 1, wherein the identity of each of the one or more pills comprises an indication of a dosage amount contained by each of the one or more pills.

17. A system as in claim 1, wherein the system is configured to record the identity and quantity of each of the one or more pills.

18. A system as in claim 1, wherein the system is configured to provide an indication of whether the one or more pills should be administered to a patient.

19. A system as in claim 1, further comprising a chamber which is configured to be closed to ambient light.

20. A system as in claim 1, further comprising a pill support and a chamber configured to house the pill support.

21. A system as in claim 20, wherein the pill support comprises a tray which is removable from the chamber.

22. A system as in claim 1, further comprising a second camera configured to obtain a visual image of the one or more pills when the pills are fully illuminated.

23. A system as in claim 1, wherein the one or more pills comprise at least one of a pill, a capsule, tablet or a caplet.

24. A system as in claim 1, wherein the one or more pills comprise a plurality of pills, and a first pill of the plurality of pills contains a first medication which is different from a second medication contained in a second pill of the plurality of pills.

25. A system as in claim 1, wherein the one or more pills comprise a single pill.

26. A method comprising:
    collecting surface image data of one or more pills;
    generating a three-dimensional point cloud of surface data for each of the one or more pills;
    generating geometric data from the three-dimensional point cloud data;
    using a computer processor to identify the one or more pills based on at least the geometric data generated from the point cloud data.

27. A method as in claim 26, wherein collecting surface image data comprises operating a structured light scanner to collect surface image data of the one or more pills.

28. A method as in claim 27, wherein operating a structured light scanner comprises applying laser light to surfaces of the one or more pills and using a first camera to capture images of laser light reflecting from the surfaces of the one or more pills.

29. A method as in claim 28, wherein applying laser light comprises using a 650 nm laser diode module.

30. A method as in claim 26, collecting surface image data comprises operating a stereoscopic imager to collect surface image data of the one or more pills.

31. A method as in claim 26, wherein identifying the one or more pills comprises applying a set of rules to the geometric data for each pill.

32. A method as in claim 26, wherein identifying the one or more pills comprises comparing the geometric data of each pill to a database containing geometric data associated with a plurality of known pills.

33. A method as in claim 26, further comprising comparing the identities of each of the one or more pills to a list of pills approved for administration to a patient.

34. A method as in claim 26, further comprising recording the identity and quantity of each of the one or more pills.

35. A method as in claim 26, wherein the geometric data includes geometric data regarding a dividing line on a pill, and identifying the pill comprises identifying the pill based on at least the geometric data regarding the dividing line.

36. A method as in claim 35, wherein the geometric data includes a thickness of the dividing line on a pill, and identifying the pill comprises identifying the pill based on at least the thickness of the dividing line.

37. A method as in claim 26, wherein the geometric data includes geometric data regarding surface texture of the more or more pills, and identifying the one or more pills comprises identifying the one or more pills based on at least the surface texture.

38. A method as in claim 37, wherein identifying the one or more pills comprises identifying the one or more pills additionally based on a measured pill color.

39. A method as in claim 26, wherein identifying the one or more pills comprises identifying the one or more pills additionally based on a measured pill weight.

40. A method as in claim 26, wherein identifying the one or more pills comprises determining a dosage amount of each of the one or more pills.

41. A method as in claim 26, wherein the one or more pills comprise a plurality of pills, and a first pill of the plurality of pills contains a first medication which is different from a second medication contained in a second pill of the plurality of pills.

42. A method of performing surface scanning, the method comprising:
    projecting a laser light pattern onto a three-dimensional surface, the laser light comprising laser light within at least one of the red and infrared spectrum;
    receiving, with a camera, laser light reflected from a portion of the three-dimensional surface; and
    using light only from at least one of a green and blue spectrum of the reflected light to determine the location of the portion of the three-dimensional surface from which the reflected light reflected.

43. A method as in claim 42, wherein projecting a laser light pattern onto a three-dimensional surface comprises projecting the laser light pattern onto a pill surface to generate three-dimensional scanning data, and the method further comprises:
    generating geometric data from the three-dimensional scanning data; and
    identifying the pill based on at least the geometric data generated from the scanning data.

\* \* \* \* \*